(12) United States Patent
Dolgoff (10) Patent No.: US 6,310,733 B1
(45) Date of Patent: Oct. 30, 2001

(54) OPTICAL ELEMENTS AND METHODS FOR THEIR MANUFACTURE

(76) Inventor: Eugene Dolgoff, 95 Post Ave., Westbury, NY (US) 11590

( * ) Notice: Subject to any disclaimer, the term of this patent is extended or adjusted under 35 U.S.C. 154(b) by 0 days.

(21) Appl. No.: 08/774,569

(22) Filed: Dec. 31, 1996

Related U.S. Application Data (60) Provisional application No. 60/023,677, filed on Aug. 16, 1996.

(51) Int. Cl.[7] ............................................... G02B 3/08
(52) U.S. Cl. ........................................................ 359/743
(58) Field of Search ..................................... 359/742, 743

(56) References Cited

U.S. PATENT DOCUMENTS

| | | | |
|---|---|---|---|
| 3,647,303 | * | 3/1972 | Kramer, Jr. ............................. 372/94 |
| 3,784,282 | * | 1/1974 | Yamazaki et al. ................... 359/742 |
| 4,670,095 | * | 6/1987 | Negishi ................................. 359/742 |
| 5,543,870 | * | 8/1996 | Blanchard ............................. 353/74 |

* cited by examiner

*Primary Examiner*—Scott J. Sugarman
(74) *Attorney, Agent, or Firm*—Elman & Associates; Gerry J. Elman (57) ABSTRACT

Improved optical elements having rises and faces, which may have annular or linear grooves, such as Fresnel spherical or cylindrical lenses, and methods of making them, are disclosed wherein an opaque coating is imparted to the rises by methods including positioning pre-printed opaque elements on a substrate such that when the optical element is pressed, stamped, embossed or molded from the substrate, rises of the completed element comprise said pre-printed opaque elements. A reflective element is made by imparting a reflective coating onto a substrate and then a non-reflective coating to the rises, e.g. by applying non-reflective material to the element and selectively cleaning it to leave a coat of non-reflective material adhering to the rises but not the faces. Photoresist, photographic emulsion, or ink may be used as the coating. Unwanted light may also be minimized by using circularly polarized light.

39 Claims, 6 Drawing Sheets

OPTICAL ELEMENTS AND METHODS FOR THEIR MANUFACTURE

CROSS REFERENCE TO RELATED APPLICATIONS

This application claims priority under 35 U.S.C. § 119(e) from provisional U.S. application No. 60/023,677, filed Aug. 16, 1996.

SUMMARY OF THE INVENTION

The improvement to optical elements having rises and faces (ones that are stepped, e.g. a Fresnel lens) disclosed herein employs a light-absorptive element adjacent the vertical rises so that the amount of light passing through or reflected from the rises is minimized.

Thus the present invention provides an improved optical element having rise portions and face portions, wherein light transmitting through or reflected from the rise portions is substantially prevented from being seen by an observer viewing an image formed by light passing through the annular lens. More particularly, the rise portions are coated with an opaque light-absorbent material.

The improved optical element may be a refractive optical element, in which event the rise portions are substantially opaque and the face portions are substantially transparent. It may also have an anti-reflective coating. It may, for example, be a Fresnel lens or a Fresnel semi-lens or a lenserF lens, as disclosed hereinbelow.

The improved optical element may be a reflective element, such as an annular mirror.

Various methods of making the improved optical element are part of the present invention. Such methods comprise the steps of producing an optical element having rise portions and face portions, and imparting a light-absorbent coating to the rise portions. The optical element may have a series of annular grooves, or the grooves may be linear. The element may be refractive, in which event an antireflective coating may also be applied, or the element may be reflective.

The light-absorbent coating may be imparted to the rises by applying light-absorbing material to the element and selectively cleaning it so as to leave a coat of light-absorbent material adhering to the rise portions but not to the face portions. Adherence may be enhanced by roughening the rise portions in advance, such as by scratching, scoring, or abrading Positive or negative photoresist may be used in the process in various ways. A coating of negative photoresist may be applied to the optical element so as to coat all faces and rises, then illuminating the photoresist so that the rises are not illuminated, so that exposed photoresist is only on the faces. Alternatively, positive resist can be used, and only the rises are illuminated. In either case, the element is then developed to remove the photoresist from the rises, and opaque material that is capable of adhering to the rises is then applied to the element. The photoresist is then removed from the faces by more developing to dissolve away remaining resist together with any of the opaque material coated on it.

Alternatively, the photoresist itself may be dark colored or dyed and left on the rises. Negative photoresist may be made to coat the rises selectively by exposing the rises but not the faces to light and then developing the optical element to remove unexposed photoresist. Alternatively, dark positive photoresist may be made to coat the rises selectively by exposing the faces but not the rises to light and then developing the optical element to remove exposed photoresist.

Other means for reducing flare and the like with stepped optical elements that are disclosed herein are also within the present invention.

DETAILED DESCRIPTION OF THE INVENTION

In general, a Fresnel lens is an optical element resembling a plano-convex or plano-concave lens that is cut into narrow rings and flattened out. Fresnel lenses can be large glass structures as in lighthouses, floodlights or traffic signals, or thin molded plastic plates with fine steps.

Fresnel lenses are commonly made from plastic, thus allowing them to be mass-produced inexpensively and quickly from a metal master. The metal master is typically made by rotating a copper or other material blank with a computer-manipulated cutting tool of diamond or other hard material. The master is then used to cast, emboss, compression mold or injection mold plastic replicas.

Conventional Fresnel lenses are formed with a series of annular rings and are therefore relatively thin, and relatively light. In contrast, conventional plano-convex and plano-concave lenses are thick, heavy, and expensive.

Fresnel lenses have poor resolving power when compared to conventional lenses because of the shape of the surface of each annulus. Each annulus of a Fresnel lens, when viewed in cross-section, has a vertical surface (a rise) and a lensfunction surface (a face). Together the faces therefore merely approximate the desired curvature of the lens.

Annular lenses, such as Fresnel lenses, also suffer from flare or scatter of light as some of the light passes through and reflects off of the rise instead of through the lens face. To improve the optical performance of annular lenses, the amount of such light scattered by the rises should be reduced to a minimum.

Earlier workers have disclosed scratching or abrading the rises of Fresnel lenses. However, such methods do not provide a satisfactory solution to the problem of scattered light because the amount of scattered light is not reduced; rather it is merely scattered and flared in a different way.

The "lenserF" is another type of annular lens. The lenserF provides a lens which has as one side a series of spaced ring-shaped planar, or annular, faces, which together approximate the planar surface of a normal plano-convex or plano-concave lens. The annular faces are separated by rises. The concentric annular faces are reminiscent of a Fresnel lens, but with the planar face being stepped, rather than the curved face as in a Fresnel lens. Thus the name: "LenserF" is "Fresnel" spelled backwards.

A lenserF is thin, but, unlike a Fresnel, it is not flat. It retains the curved shape and depth of the plano-convex lens or plano-concave lens, and provides much better resolving power than a corresponding Fresnel lens that approximates the same curve. The effect of such a curvature is to create a cavity in which additional lenses (lenserF or others) can be placed. Compounding or cascading of lenses can take place in a much smaller volume, allowing lenses to be closer together than with conventional lenses (allowing greater magnification, chromatic aberration correction, lower F number, etc.). Compound plastic lenses are capable of being made to minimize chromatic aberration.

An improvement to annular lenses, including Fresnel and lenserF lenses, disclosed herein comprises means for decreasing the amount of light scattered from the rises of the lens.

A number of techniques are disclosed herein which are optionally used alone, or in combination with scratching or abrading the rises, to reduce the light reflecting from the rises. These include: (1) coating the rise with opaque material; (2) applying an anti-reflective (AR) coating to portions of the annuli of the lens; (3) pressing the lens from a blank having pre-printed opaque rings so that the pre-printed rings cover the rises of the lens; (4) using a transparent polar-analyzer in conjunction with polarized light; (5) using an opaque annular ring mask in conjunction with the lens; and (6) using photographic exposures of rings onto photosensitized rises and employing hydrophilic and hydrophobic coatings, copper over-coated with nickel with acid etched rings in the nickel, greasy ink, and water.

Specific substances appropriate to these purposes are known to those of skill in chemical technology. This information may be ascertained from customary reference works in this field, including for example the *Kirk-Othmer Encyclopedia of Chemical Technology, Beilstein's Handbuch*, and *Chemical Abstracts*.

These methods will be described below in greater detail using as an example of annular lens, However, it is to be understood that they are similarly applicable to other optical elements having rises.

(1) One method employs coating the rises of the lens with an opaque absorptive material. Generally, an opaque material such as ink is made to adhere to the rise, while leaving other portions of the lens free of opaque material. The rise portion of the lens is preferably scratched, abraded or scored during manufacture to promote better adherence of opaque material to the rise portion.

(1a) The rise is desirably scratched, abraded or scored during manufacture to facilitate adherence. Opaque material such as ink may thereafter be applied to an annular lens or other optical element by dipping, spraying or other conventional means, then subjecting it to a brief wash, with or without wiping by rubber or other material with appropriate grooves. Such a technique results in a coat of ink adhering to the scratched rise and leaves the smooth lens faces uncoated.

(1b) In another embodiment of the invention, the application of opaque material to selected areas of an annular lens is optionally achieved by the use of a photoresist. The photoresist is then used to protect the coated regions of the lens from the opaque material. This embodiment of the invention is optionally implemented by applying a coating of positive photoresist to the entire lens. Positive photoresist generally softens or depolymerizes upon exposure to light. A light shield with an appropriate opening (e.g. wedge-shaped) is then placed over the lens, so that when the lens is exposed to light from the proper angle, the faces are not exposed to light. The lens is rotated to provide successive exposure of the lens rises around the entire 360 degrees. By this process the rises, but not the faces, are exposed to light. A resist developer is then used to rinse away the photoresist from the rises, while leaving the unexposed photoresist on the face portions. The entire lens can then be coated with opaque material that is capable of adhering to the lens rises but that is prevented from adhering to the lens faces because of the presence of the photoresist thereon. The photoresist is then removed from the lens faces by further rinsing with developer to dissolve away the unexposed resist together with the opaque material coating it. This process leaves rises coated with opaque material and clear faces.

(1c) Yet another embodiment of the invention that uses a negative photoresist is as follows. Negative photoresist generally hardens or polymerizes upon exposure to light. As in the method described in section (1b) above, the lens is dipped or sprayed in photoresist and then exposed to a properly masked light. In this method, however the light exposure is arranged to strike the resist only on the faces. A developer will rinse away the unexposed negative photoresist from the rises. Coating of the lens with opaque material, and removal of remaining resist and opaque material from the faces is then performed as disclosed above.

(1d) Yet another embodiment of the invention involves using a photoresist that is black or other dark color, dyed black or other dark color, or is otherwise opaque once the process is finished. With proper exposure and development, e.g. as described above, the rises are left coated with the black resist, while the faces are left uncoated.

(1e) In another embodiment of the invention, pre-printed opaque rings or striations are positioned on material such as flat plastic such that when the lens or other optical element is pressed, stamped, embossed or molded, the rise portions of the completed lens will be made up of the opaque pre-printed rings.

(1f) In yet another embodiment, a transparent element having pre-printed thereon opaque lines or circles is positioned with respect to the rises of an existing stepped optical element such that the opaque markings intercept a substantial portion of the light which passes through, or which reflects off of, the rises. Optionally the opaque markings may be on the reverse side of the substrate from which the optical element is constructed.

(1g) In another embodiment, emulsion coated on both faces and rises of the lens are scanned by laser or exposed to an annular pattern to become dark on rises while being clear on faces after standard photographic development.

(1h) In another embodiment, grooves are formed in the lens surface when the lens is made. Then ink is put on and "doctor bladed" off, leaving ink in the grooves. Drying of the ink can be done by air, UV, heat, etc.

(2) Another embodiment of the invention involves applying an antireflective coating to virtually all surfaces of the lens to reduce reflection of any light from it. This embodiment of the invention effects its result in a manner similar to the way in which an AR coating on a television tube eliminates the reflections from room lights. In this embodiment of the invention, an AR coating applied to the Fresnel lens also coats the rises, thus reducing the reflection of light that impinges on or reflects from the rises.

Yet a further embodiment of the invention includes an AR coating on virtually all surfaces of an annular lens and an opaque coating on the rises. This embodiment combines a reduction of light reflected from the faces and an absorption of light that would otherwise pass outwardly through the rises, to further reduce light passing through or reflecting from the rise portions.

(3) In another embodiment of the invention, scattering from the rises of the lens is reduced by using an image source that produces circularly polarized light. Such an image source is optionally an LCD in conjunction with an appropriate polarizer, or it is optionally another source of light that has been circularly polarized. In this embodiment, only light which passes through the lens face directly without being reflected from the rise will be transmitted by a circular analyzer.

Annular Lens Embodiments

Figure 1A:
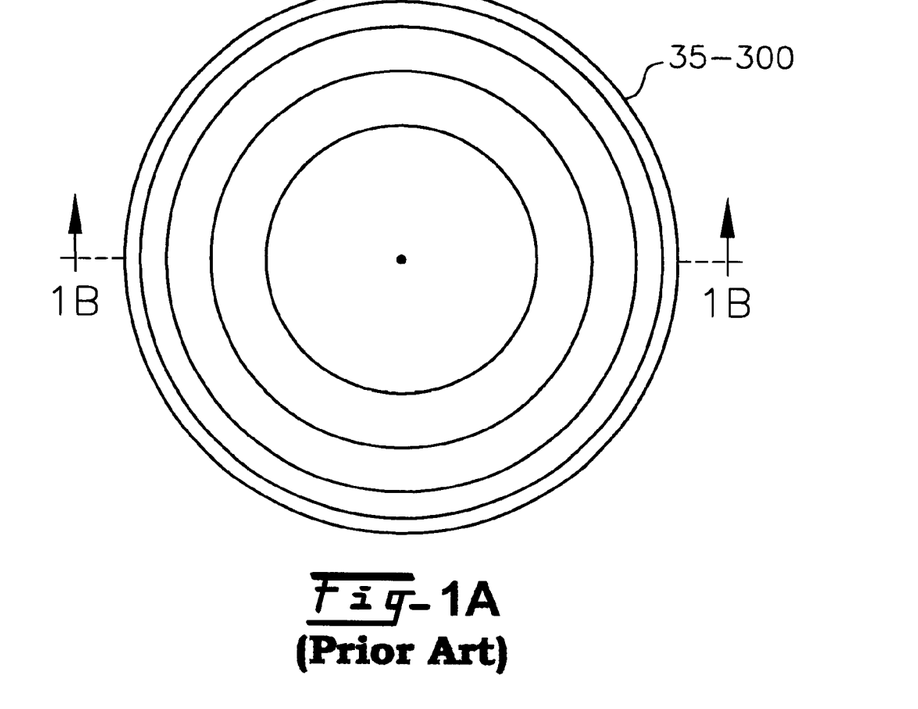
FIG. 1A is an elevation view of a Fresnel lens.
Figure 1B:
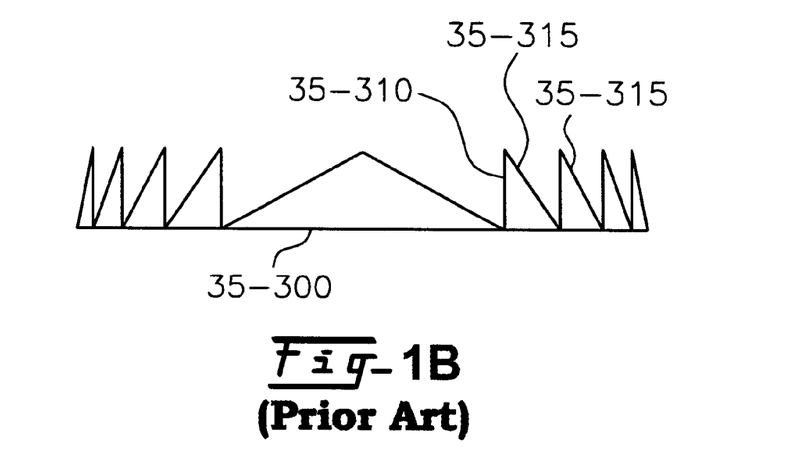
FIG. 1B is a cross-section view of a Fresnel lens taken at line 1B—1B.

FIG. 1A shows a plan view of a Fresnel lens 35-300 of the prior art. FIG. 1B is a cross-sectional view of a Fresnel lens 35-300, taken at line 1B—1B. Shown is a rise portion 35-310 and a face portion 35-315.

Figure 2:
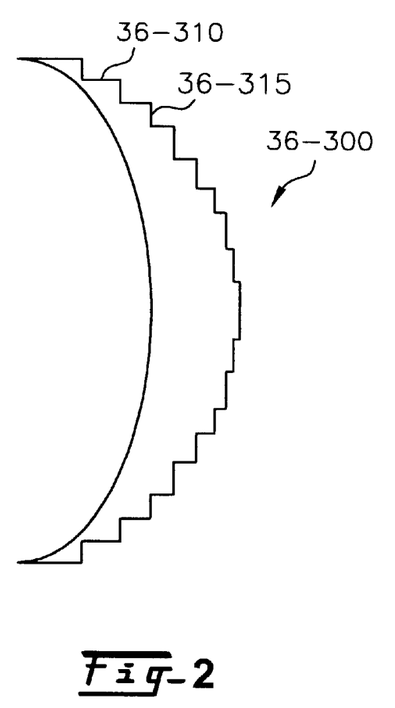
FIG. 2 is a cross-section view of a "lenserF" lens (LenserF is Fresnel backwards).
Figure 3:
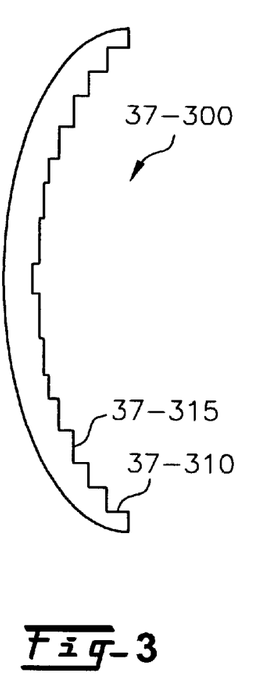
FIG. 3 is a cross-section view of a plano-convex lenserF lens.

LenserF lenses are shown in FIGS. 2 and 3. FIG. 2 shows a cross section of a plano-concave lenserF 36-300, which has rise portion 36-310 and a face portion 36-315. FIG. 3 shows a cross section of a plano-convex lenserF 37-300.

Figure 4:
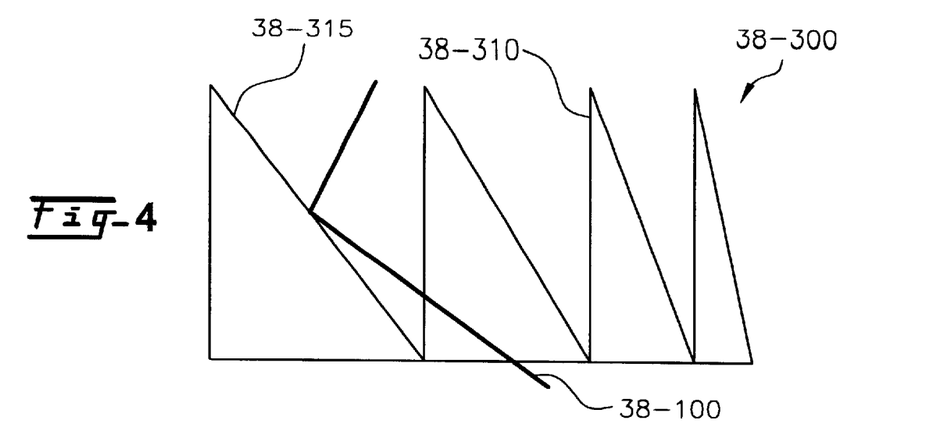
FIG. 4 is a cross-section view of a portion of a Fresnel lens schematically illustrating light passing through the rise portion of the lens.

In FIG. 4 are shown details of a Fresnel lens 38-300 in cross-sectional view. Light ray 38-100 is shown. Rise portion 38-310 and face portion 38-315 are depicted.

Light ray 38-100 passes through rise portion 38-310. Light ray 38-100 then reflects from face portion 38-315, contributing to scatter or flare.

Figure 5:
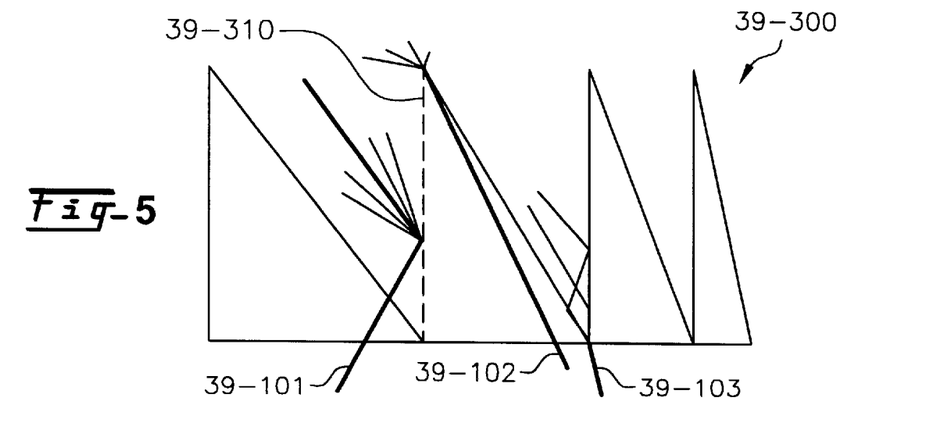
FIG. 5 is a cross-section view of a portion of a Fresnel lens which has a scored rise and shows light reflecting and scattering from the scored rise.

FIG. 5 shows details of a Fresnel lens 39-300 in cross-sectional view. Light rays 39-101, 39-102, and 39-103 are shown. Also shown is scored rise 39-310. FIG. 5 schematically illustrates additional scatter or flare arising from light ray 39-101 being reflected from a scratched rise 39-310 of a prior art Fresnel lens. Light ray 39-102 is shown to produce additional scatter or flare as it passes through the scored rise 39-310 and is refracted. Light ray 39-102 is shown to contribute additional scatter and flare. Light ray 39-103 contributes to scatter and flare.

Figure 6:
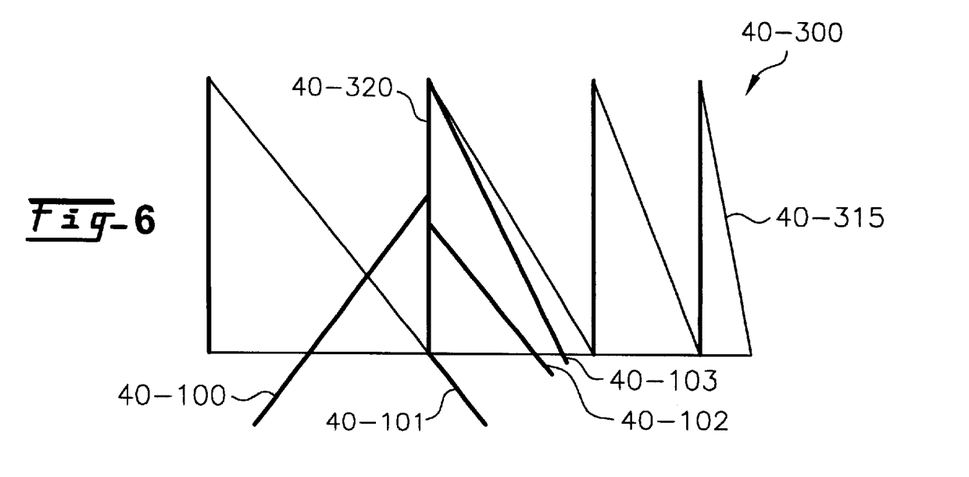
FIG. 6 is a cross-section view of a portion of a Fresnel lens which has an opaque coating on the rise, reducing scatter and flare.

FIG. 6 shows light rays 40-100, 40-101, 40-102, and 40-103. FIG. 6 also shows details of a Fresnel lens 40-300 in cross-sectional view. Also shown are each opaque rise portion 40-320. Light rays 40-100, 40-101, 40-102, and 40-103 are each shown to be absorbed upon hitting the rise portion 40-320.

In accordance with the present invention, an opaque material such as ink or other coating material is made to adhere to the rise, while leaving other portions of the lens free of opaque material. The rise of the lens is preferably scratched, abraded or scored during manufacture to promote better adherence of material to the rise.

Opaque material is optionally applied to a lens by dipping or spraying the lens with a coating such as ink, then subjecting the lens to a brief wash. Such a technique results in a coat of ink adhering to the scratched rise and leaves each smooth lens face uncoated.

Figure 7:
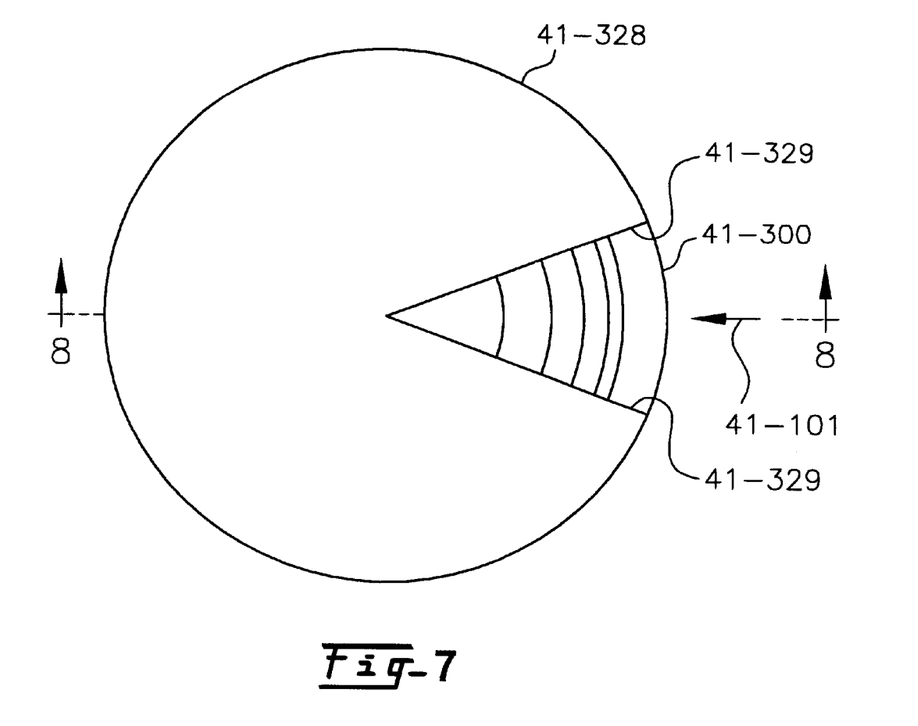
FIG. 7 is a plan view of an annular lens of the present invention which is coated with photoresist and is partially covered with a light shield.

FIG. 7 shows another way to provide such opacity using photoresist on a Fresnel lens 41-300. A light shield 41-328 with a wedge-shaped opening 41-329 is shown.

Figure 8:
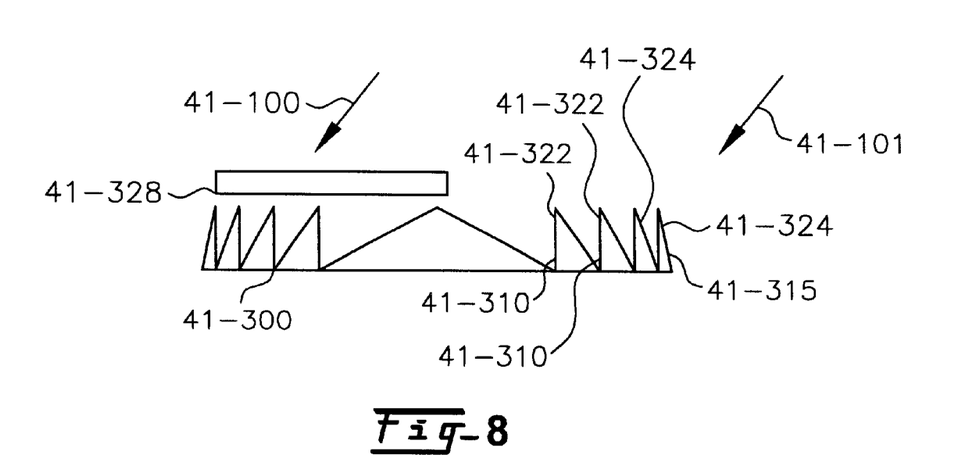
FIG. 8 is a cross-sectional elevation view of the annular lens of FIG. 7, taken along the line 8—8.

FIG. 8 is a cross sectional view of FIG. 7 taken along line 8. Light rays 41-100 and 41-101 are shown. Unexposed photoresist 41-322 is shown. Exposed photoresist 41-324 is shown. Also shown is light shield 41-328.

In an embodiment of the lens improvement, the application of opaque material to each rise of the lens is optionally achieved by the use of a photoresist. This embodiment of the invention is optionally implemented by applying a coating of negative photoresist to the entire lens 41-300. A light shield 41-328 with a wedge-shaped opening 41-329 is then placed over the lens 41-300, so that when the lens is exposed to light as from light ray 41-100 from the proper angle, each rise 41-310 is not exposed to light. The lens 41-300 is rotated to provide successive exposure of each lens face 41-315 around the entire 360 degrees. By this process each face 41-315, but not any rise 41-310, is exposed to light.

A resist developer is then used to rinse away the photoresist from each rise 41-310, while leaving the exposed photoresist on each face 41-315. The entire lens 41-300 can then be coated with opaque material that is capable of adhering to the lens 41-300 but that is prevented from adhering to the lens faces because of the presence of the photoresist thereon. The photoresist is then removed from each face 41-315 by further rinsing with developer to dissolve away the exposed resist 41-324 together with the opaque material coating it. This process leaves each rise 41-310 coated with opaque material and every face 41-315 clear.

Yet another embodiment of the invention that uses a positive photoresist is as follows. As in the method described above, the lens 41-300 is dipped or sprayed in photoresist and then exposed to a properly masked light. In this method, however, the light exposure is arranged to strike the resist only on each rise 41-310. A developer will rinse away the exposed positive photoresist from each rise 41-310. Coating of the lens 41-300 with opaque material is performed as disclosed above. The resist is developed away each face 41-315.

Yet another embodiment of the invention involves using a photoresist that is dyed dark. With proper exposure and development, each rise 41-310 is left coated with the black resist, while each face 41-315 is left uncoated.

Figure 9:
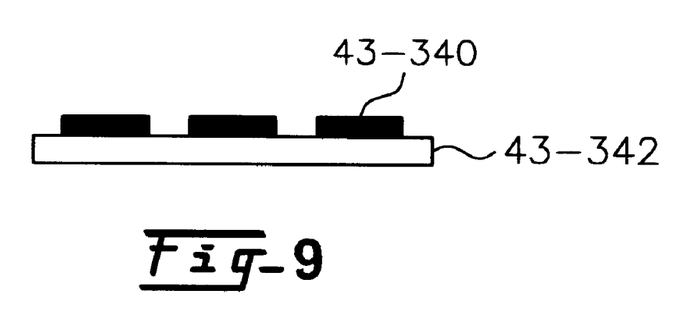
FIG. 9 is a cross-section view of a sheet of plastic lens material having opaque pre-printed rings thereon, preparatory to being formed into an annular lens of the present invention.
Figure 10:
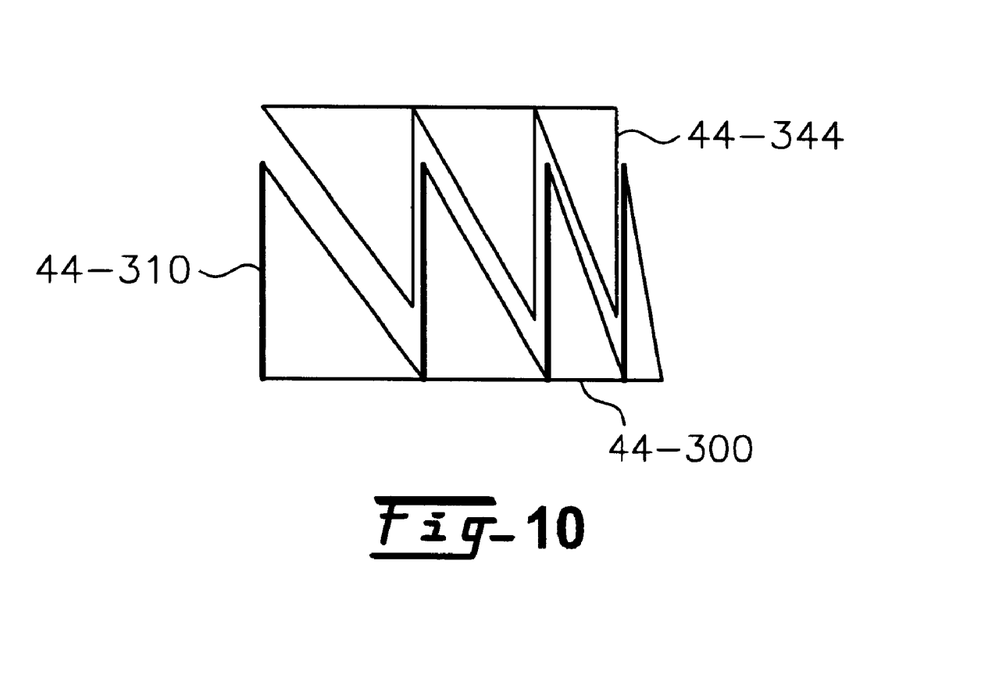
FIG. 10 is a cross-section view of a step in the formation of an annular lens of the present invention by a press or mold, forming a lens with opaque rises from the sheet of plastic material shown in FIG. 9.

Referring now to FIGS. 9 and 10, in another embodiment of the invention there are opaque pre-printed rings 43-340 positioned on lens material 43-342. The opaque pre-printed rings 43-340 are positioned such that when a lens 44-300 is pressed, stamped, embossed or molded, each rise 44-310 of the completed lens 44-300 will be made up of the opaque pre-printed rings 43-340.

Figure 11:
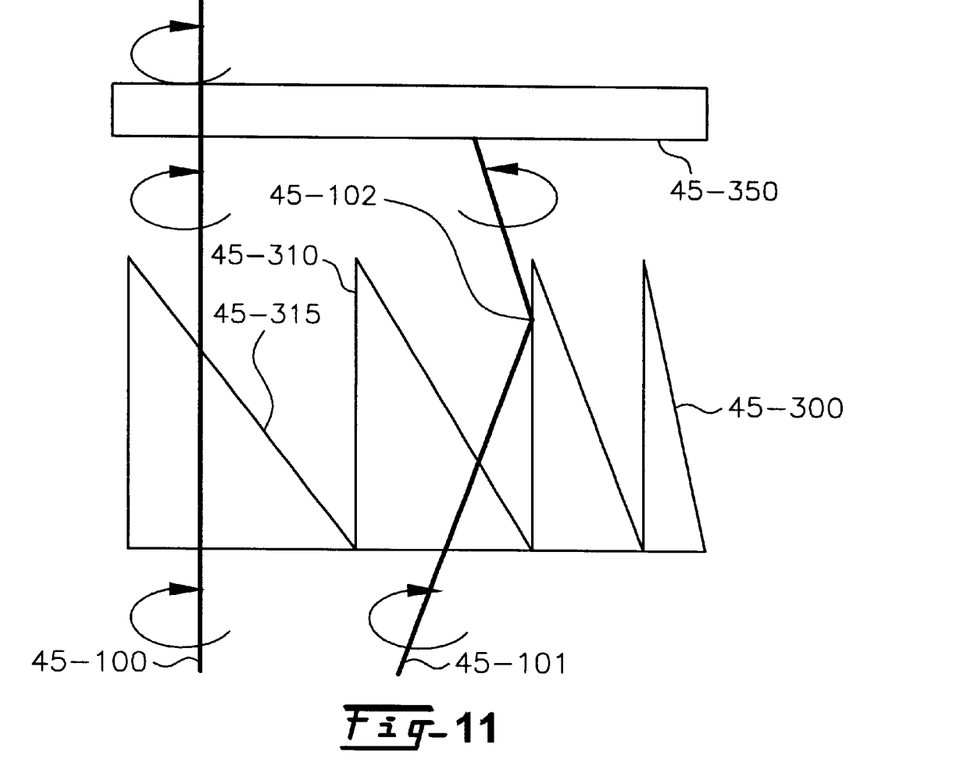
FIG. 11 is a cross-section view of a portion of an annular lens, and a wave plate, schematically illustrating the passage of beams of polarized light therethrough.

FIG. 11 shows an embodiment involving circularly polarized light. Light ray 45-100, light ray 45-101, and light ray reference point 45-102 are shown. Also shown are the Fresnel lens 45-300, each rise portion 45-310, each face portion 45-315, and a circular polarizer 45-350.

Scattering from each rise 45-310 of the lens 45-300 is reduced by providing an image source that produces circularly polarized light. Such light is optionally provided by the output from an LCD or is optionally other light that has been circularly polarized. In this embodiment, a circular polarizer 45-350 is provided so that light ray 45-100 which passes through the face will be properly transmitted by circular polarizer 45-350. However, when light ray 45-101 reflects from the rise 45-310 at light reference point 45-102, its polarization will change and it will not pass through the circular polarizer 45-350.

Figure 12:
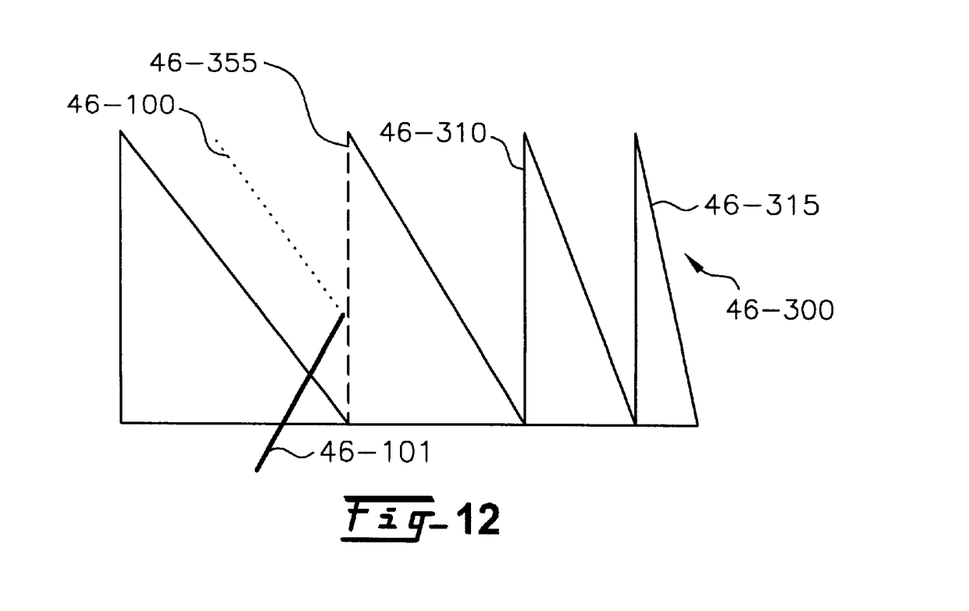
FIG. 12 is a cross-section view of a portion of an annular lens coated with anti-reflective (AR) coating, schematically illustrating the effect of AR coating on a beam of light.

Referring now to FIG. 12, another embodiment of the invention involves applying an anti-reflective (AR) coating to the lens 46-300 to reduce reflection of any light from any face 46-315 and any rise 46-310. This embodiment of the invention effects its result in a manner similar to the way in which an AR coating on a television tube eliminates the reflections from room lights. In this embodiment of the invention an AR coating applied to the Fresnel lens also coats each rise 46-310, thus reducing the reflection of light 46-100 that passes through the lens 46-300.

Yet a further embodiment of the invention uses an AR coating together with an opaque coating 46-355. This embodiment combines a reduction of light reflected from any face 46-315 and an absorption of light to further reduce light passing through or reflecting from any rise 46-310.

The present invention may be embodied in other specific forms without departing from its spirit or essential characteristics. The described embodiments are to be considered in all respects as illustrative and not restrictive. All changes which come within the meaning and range of equivalency of the claims are to be embraced within their scope. The inventor intends that all patentable subject matter disclosed herein eventually be the subject of patent claims, regardless of whether presented upon the initial filing of the application represented by this document or in a subsequent filing.

What is claimed and desired to be protected by United States Patent is:

1. A method for minimizing the light scattered by an optical element having rises and faces, said method comprising circularly polarizing the light impinging on said optical element.

2. An improved optical element having rises and faces, wherein light is substantially blocked from being reflected from said rises, whereby it is prohibited from being seen by an observer viewing an image formed by light reflected by said faces.

3. An improved optical element as in claim 2, wherein said optical element is a reflective optical element and said rises are substantially non-reflective.

4. A method of making an improved optical element, comprising the steps of:
   (a) producing an optical element having rises and faces, and
   (b) imparting an opaque coating to said rises by a step which comprises:
   positioning pre-printed opaque coating elements on a substrate material such that when the optical element is pressed, stamped, embossed or molded from said substrate material, rises of the completed element comprise said pre-printed opaque coating elements.

5. The method of claim 4, wherein said optical element has a series of annular grooves.

6. The method of claim 4, wherein said optical element has a series of linear grooves.

7. The method of claim 4, wherein said optical element is a refractive element.

8. The method of claim 7, additionally comprising:
   applying an anti-reflective coating to said refractive element to reduce reflection of light.

9. The method of claim 4, wherein said optical element is a reflective element.

10. An improved optical element having rises and faces, wherein an opaque coating has been imparted to said rises by the method of claim 4.

11. The optical element of claim 10, wherein said optical element is a refractive element.

12. The optical element of claim 10, wherein said optical element is a reflective element.

13. A method of making an improved optical element, comprising the steps of:
   (a) producing a reflective optical element having rises and faces, and
   (b) imparting a coating to said rises which is substantially non-reflective as compared to the faces.

14. The method of claim 13, wherein said optical element has a series of annular grooves.

15. The method of claim 13, wherein said optical element has a series of linear grooves.

16. The method of claim 13, wherein said imparting step (b) is performed by:
   (i) applying non-reflective material to said optical element; and
   (ii) selectively cleaning said optical element so as to leave a coat of non-reflective material adhering to said rises but not to said faces.

17. The method of claim 13, additionally comprising:
   roughening said rises before said imparting step (b), thereby enhancing the adherence of said non-reflective material thereto.

18. The method of claim 13, wherein said imparting step (b) is performed by:
   coating a photoresist on said faces, said photoresist being coated by:
   applying a coating of photoresist to the optical element so as to coat substantially all faces and rises;
   selectively illuminating said coating of photoresist such that when the photoresist is developed, it adheres to said faces but is removable from said rises upon development;
   developing said coating to remove said photoresist from said rises, so as to leave photoresist remaining on said faces;
   applying to said optical element non-reflective material that is adherent thereto, wherein said non-reflective material is prevented from adhering to said faces because of the photoresist thereon;
   removing said photoresist from said faces by rinsing with a developer to
   dissolve away the remaining photoresist together with any of said non-reflective substance coated thereon;
   whereby an optical element is produced having rises coated with non-reflective material and faces that are reflective.

19. The method of claim 13, wherein said imparting step (b) is performed by:
   coating a non-reflective photoresist on said rises, said photoresist being coated by:
   applying a coating of photoresist to the optical element so as to coat substantially all faces and rises;
   selectively illuminating said coating of photoresist such that when the photoresist is developed, it adheres to said rises but is removable from said faces upon development;

developing said coating to remove said photoresist from said faces, so as to leave photoresist on said rises;

whereby an optical element is produced having rises coated with non-reflective material and faces that are reflective.

20. The method of claim 16, wherein the applying step (i) is performed by dipping or spraying.

21. The method of claim 16, wherein the cleaning step (ii) is performed by subjecting the optical element to a wash.

22. The method of claim 16, wherein grooves are formed in the surface of the rises of the optical element when it is produced, and the cleaning step (ii) is performed by wiping or doctor blading, whereby non-reflective material is left in the grooves.

23. An improved reflective optical element having rises and faces, wherein a coating has been imparted by the method of claim 13.

24. A method of making an improved optical element, comprising the steps of:
  (a) producing an optical element having rises and faces, wherein the rises are roughened to facilitate adherence of an opaque light-absorbent coating thereon;
  (b) applying a coating to the rises and faces; and then
  (c) removing the coating from the faces;
  whereby the coating on the rises prevents light rays from being transmitted through or reflected from the rises.

25. The method of claim 24, wherein the applying step (b) is performed by dipping or spraying.

26. The method of claim 24, wherein the removing step (c) is performed by subjecting the optical element to a wash.

27. The method of claim 24, wherein the rises are roughened by forming grooves in the surface thereof when the optical element is produced, and the removing step (c) is performed by wiping or doctor blading, whereby coating material is left in the grooves.

28. An improved optical element having rises and faces, wherein a coating has been applied to said rises by the method of claim 24.

29. A method of making an improved optical element, comprising the steps of:
  (a) producing an optical element having rises and faces, and
  (b) imparting an opaque coating to said rises by a process which comprises:
  coating a photographic emulsion on the rises and faces;
  selectively illuminating the optical element in a manner to cause the photographic emulsion upon development to become dark on rises and clear on faces; and then developing the photographic emulsion and leaving it in place thereon.

30. The method of claim 29, wherein the optical element is selectively illuminated by scanning it with a laser.

31. The method of claim 29, wherein the optical element is selectively illuminated by exposing it to a pattern that is annular if the rises are circular or is linear if the rises are linear.

32. An improved optical element having rises and faces, wherein an opaque coating has been imparted to said rises by the method of claim 29.

33. A method of making an improved optical element, comprising the steps of:
  (a) producing an optical element having rises and faces, and
  (b) imparting an opaque light-absorbent coating to said rises by a process which comprises:
  coating a photographic emulsion on the rises and faces;
  selectively illuminating the optical element by exposing it in a manner to cause the photographic emulsion upon development to become hydrophobic on rises and hydrophilic on faces;
  developing the photographic emulsion; and
  applying greasy ink and water to the rises and faces, whereby greasy ink adheres to the rises and not the faces.

34. An improved optical element having rises and faces, wherein an opaque light-absorbent coating has been imparted to said rises by the method of claim 33.

35. A method of making an improved optical element, comprising the steps of:
  (a) producing an optical element having rises and faces, and
  (b) providing opaque markings that are not on the surface of the rises but which are so positioned with respect to the rises that the opaque markings intercept a substantial portion of the light which would pass through or reflect off of the rises.

36. The method of claim 35, wherein the opaque markings are on a transparent element having the opaque markings pre-printed thereon.

37. An improved optical element having rises and faces, wherein opaque markings have been provided by the method of claim 35.

38. A method of making an improved optical element, comprising the steps of:
  (a) producing an optical element having a first side with rises and faces and a reverse side without rises and faces, and
  (b) providing opaque markings on said reverse side, the markings being so positioned that they intercept a substantial portion of the light which would otherwise pass through or reflect from the rises.

39. An improved optical element having rises and faces, wherein opaque markings have been provided by the method of claim 38.

\* \* \* \* \*